United States Patent [19]

Monahan et al.

[11] 3,746,776
[45] July 17, 1973

[54] RESIN COATED WOODEN POLES AND LIGHT STANDARDS INCORPORATING SAME

[75] Inventors: Victor C. Monahan; Gerald L. Monahan, both of Tacoma; Clyde Y. Cundy, Olympia, all of Wash.

[73] Assignee: Cascade Pole Company, Tacoma, Wash.

[22] Filed: Feb. 4, 1971

[21] Appl. No.: 112,781

Related U.S. Application Data

[62] Division of Ser. No. 714,628, March 20, 1968, Pat. No. 3,562,403.

[52] U.S. Cl. .................... 174/45 R, 52/28, 52/301, 52/517, 52/721, 117/148, 156/192, 174/38, 240/84, 248/221, D48/31
[51] Int. Cl. ......................... F21s 1/10, E04h 12/00
[58] Field of Search ................ 174/38, 44, 45 R, 174/149, DIG. 4; 21/7; 29/155 C, 592; 52/28, 40, 168, 301, 515, 517, 697, 720, 721, 727, 728; 61/54; 117/57, 58, 147, 148, 149; 144/309 Y; 156/172, 191, 192, 257, 281; 240/25, 73 BA, 84; 248/221

[56] References Cited
UNITED STATES PATENTS

| | | | |
|---|---|---|---|
| 1,972,187 | 9/1934 | Farnam | 174/45 R X |
| 2,195,013 | 3/1940 | Rastetter et al. | 174/45 R UX |
| 2,540,784 | 2/1951 | Hocher | 248/221 |
| 2,689,104 | 9/1954 | Pfaff, Jr. | 248/221 X |
| 2,870,793 | 1/1959 | Bailey | 174/45 R UX |
| 3,058,839 | 10/1962 | Kemp | 117/149 X |
| 3,360,601 | 12/1967 | Rosenberg | 174/45 R |

OTHER PUBLICATIONS

Electrical World, Vol. 167, No. 8, Feb. 20, 1967, Inside of the Back Cover Page.

*Primary Examiner*—Laramie E. Askin
*Attorney*—Graybeal, Cole & Barnard

[57] ABSTRACT

Resin coated, preservative impregnated wooden poles having one or more longitudinal kerfs, for stress relieving and ventilation purposes, at least one kerf being cut to a depth slightly greater than the thickness of the sapwood of the pole. A shielded electrical conduit is emplaced in one such kerf and covered by a wood putty or like filler restoring the surface profile of the pole, and the pole is encased to a thickness of at least about 1/10 inch with a sprayed-on resin mix, such as a mixture of chopped glass fibers and catalyzed polyester resin. Modifications include a covering of cellophane, paper or the like applied between the pole and the plastic coating especially when an oil base preservative is used, and a top cap to prevent entrance of moisture and to ventilate the interior of the pole. Various luminaire support arms and techniques for mounting thereof on the pole are also disclosed.

14 Claims, 15 Drawing Figures

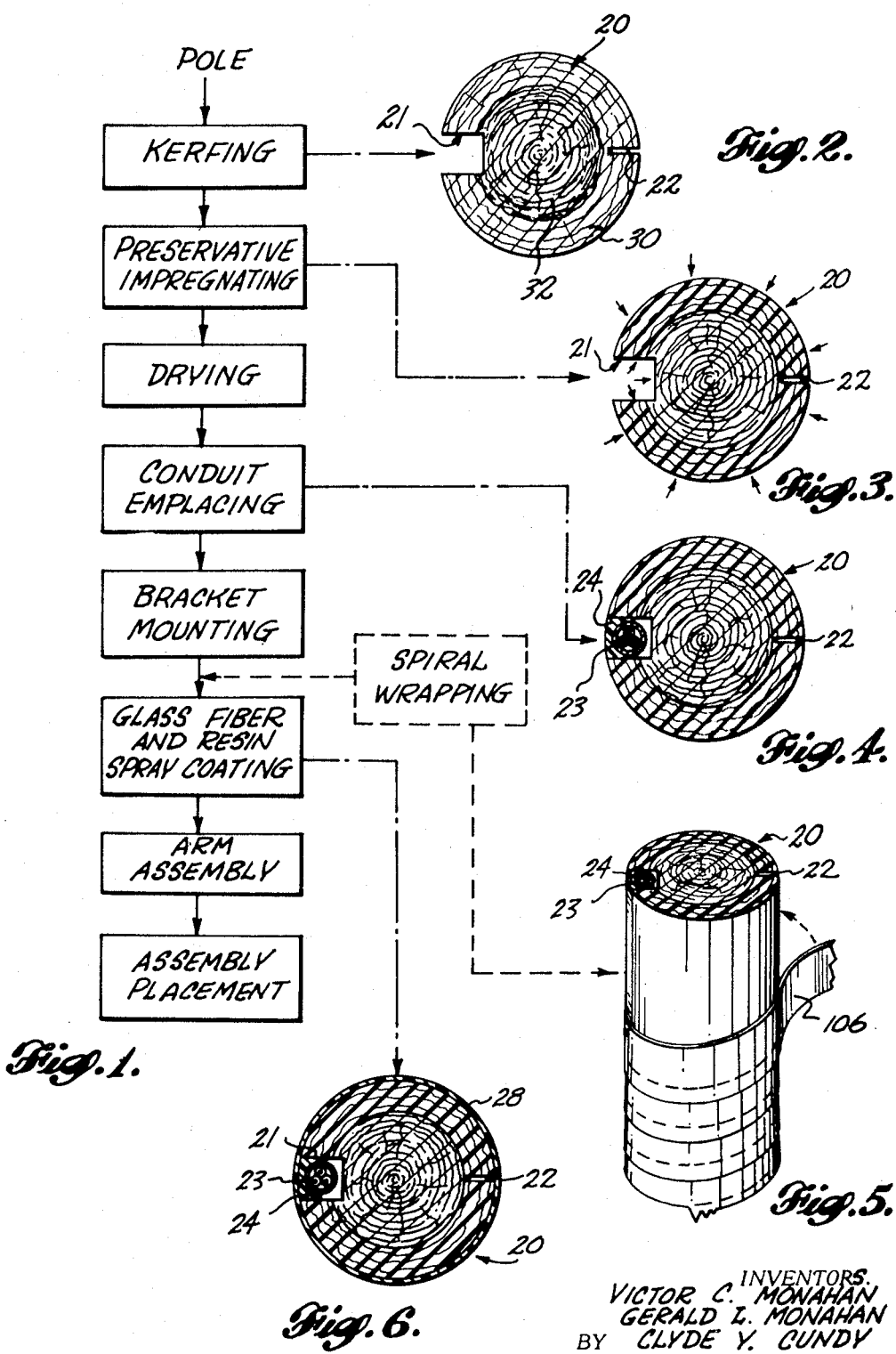

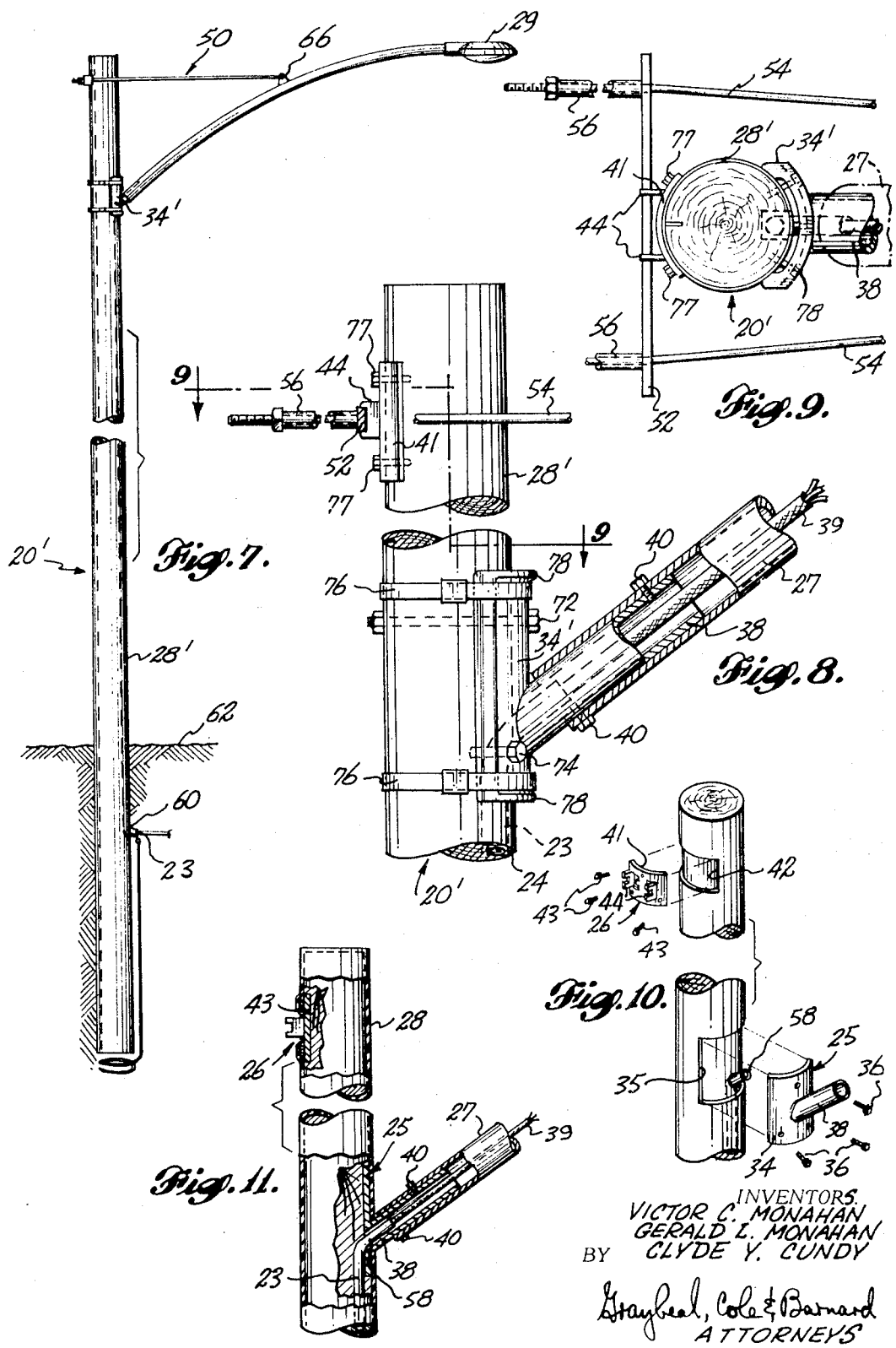

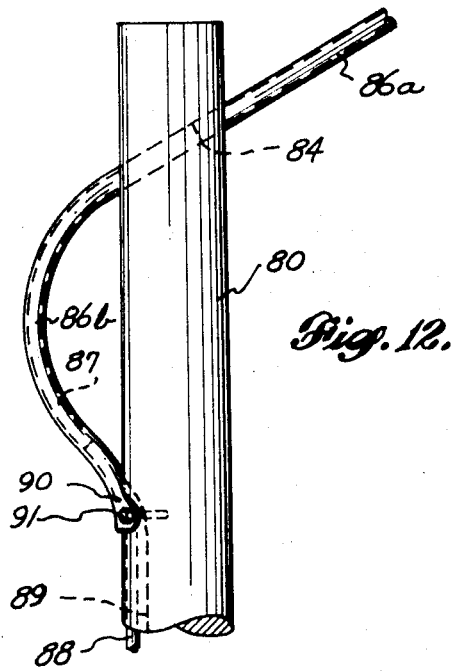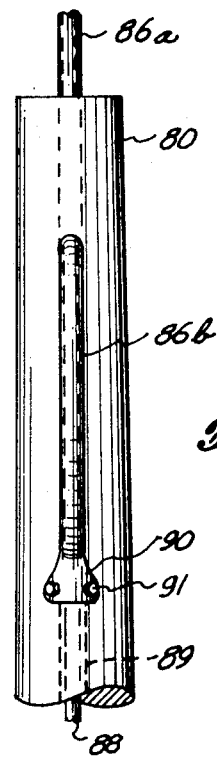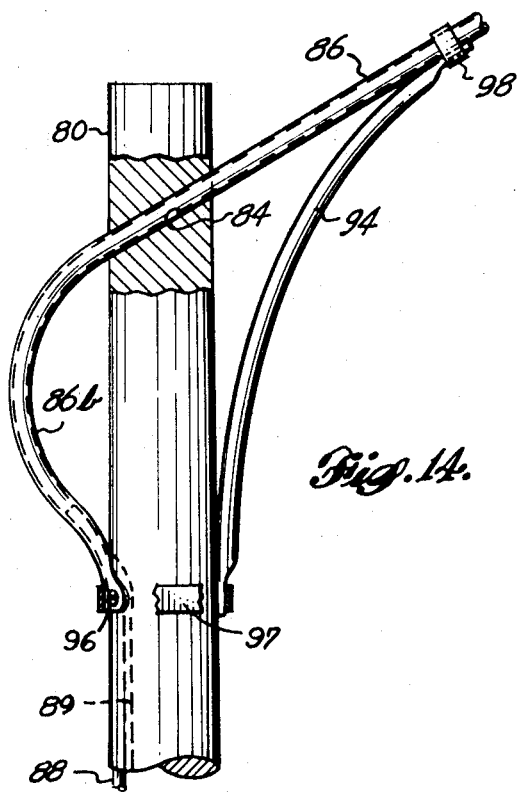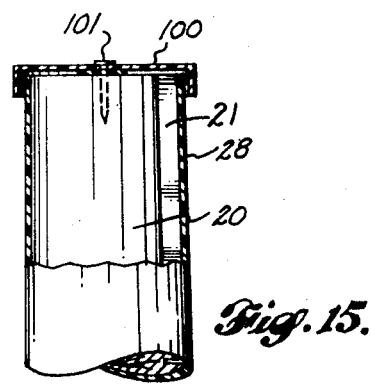

RESIN COATED WOODEN POLES AND LIGHT STANDARDS INCORPORATING SAME

CROSS REFERENCE TO RELATED APPLICATION

This is a division of application Ser. No. 714,628, filed Mar. 20, 1968, now U.S. Pat. No. 3,562,403, issued Feb. 9, 1971.

FIELD OF THE INVENTION

This invention relates to resin coated wooden utility poles and, more particularly, to wooden poles and techniques of making wooden poles encased by a glass fiber reinforced resin (GFRR) coating or encasement. The invention also relates to improved pole mounted lateral support arms and to techniques for fastening the arms to the poles to provide integrated light standard assemblies.

DESCRIPTION OF THE PRIOR ART

Heretofore most wooden utility poles have been made of fir, pine, or cedar, pressure impregnated with a preservative such as creosote or an oil solution of pentachlorophenol. Wooden poles are expected to last from 30 to 40 years in most localities, and the principal cause of deterioration is not or decay which generally occurs at the ground line. Woodpeckers and termites are also a large cause of damage causing earlier replacement. Other causes of early replacement are checking, splitting and shell rot.

Metal poles have been used in some instances to overcome the deficiencies of the treated wooden poles particularly for applications where climate or soil conditions cause an increase in the rate of deterioration. Metal poles, however, are expensive to manufacture and in many instances produce undesirable electrical phenomena limiting their usefulness for most applications.

While experimentation has been done with plastic coatings for wooden poles as a substitute for metal poles, the known results have been generally unsatisfactory presumably because of the coating techniques, materials used, and/or the impracticality of the final pole configuration.

SUMMARY OF THE INVENTION

Applicants' invention pertains to preservative treated, plastic encased wooden poles but relates to unique fabricating techniques and final pole configurations which impart to relatively inexpensive wooden utility poles increased strength, greater resistance to deterioration, and an improved appearance comparable to that of metal poles. In principle, applicants overcome the shortcomings of prior art wooden poles by providing at least one and preferably two kerfs or cuts along a substantial length of the pole prior to application of a reinforced resin coating on the surface of the pole. At least one of the kerfs extends into the heartwood of the pole to improve impregnation of the preservative, provide a drain for the preservative, and provide a recess for embedment of the hidden electrical conduit when the pole mounts a lighting device. The kerf or kerfs relieve residual stresses caused by wood shrinkage and allow an outwardly unnoticeable buildup of resin at the point of the pole subjected to the greatest stresses. In general, these resin encased poles are comparable in appearance to metal poles but are relatively inexpensive to manufacture. They are also more highly resistant to deterioration, as compared with uncoated wooden poles, and may be colored any desired color to be inconspicuous in their surroundings. Resin coated wooden poles characteristic of the invention are substantially stronger than unencased wooden poles, but are not as strong as comparable metal poles. This latter feature is an advantage from the point of view of safety considerations where the poles are used roadside to support highway lighting equipment, since metal poles are often so rigid as to present such an obstacle to a motor vehicle as to aggravate accident damage.

Yet another feature of the invention is that the resin coating of the wooden pole is substantially impervious to atmospheric moisture, particularly when the top of the pole is also plastic coated or the pole is provided with a top cap (cf FIG. 15) or the like. This immunity to atmospheric moisture renders practical the impregnation of the pole with water soluble preservative salts rather than the customary, more expensive oil base preservatives.

Another aspect of the present invnetion is to providd laterally extending luminaire support means suitable for use on either wooden or metal poles. One such form of luminaire support means includes a single-piece structure extending through an inclined bore in the pole, bent and fastened at the lower end and laterally extended from the other side of the pole at the arm's upper end, with or without additional support braces.

BRIEF DESCRIPTION OF THE DRAWINGS

FIG. 1 is a series of block diagrams illustrating a sequence of fabrication and assembly steps according to the invention.

FIG. 2 is a diagrammatic illustration of an uncoated, trimmed wooden pole, provided with two longitudinal kerfs.

FIG. 3 is a diagrammatic illustration of an uncoated pole, with arrows diagrammatically indicating the application of the impregnated preservative.

FIG. 4 is a diagrammatic illustration of an uncased pole after preservative impregnation and with an electrical conduit emplaced in one of the longitudinal kerfs and capped by a wood putty filler.

FIG. 5 is a schematic illustration of a modified operation wherein a wrapping of cellophane or the like is added to the impregnated, uncoated pole.

FIG. 6 is a diagrammatic illustration of a kerfed and impregnated pole encased in a protective resin coating.

FIG. 7 is a schematic illustration of a completed resin coated pole, equipped with a support arm and ligthing unit, and with it installed in the ground.

FIG. 8 is an enlarged fragmentary elevational view of the support arm portion of the pole shown in FIG. 7, with parts broken away to show additional details thereof.

FIG. 9 is a fragmentary horizontal sectional view taken generally along the line 9—9 of FIG. 8.

FIG. 10 is a fragmentary, exploded isometric view of a modified form of resin coated utility pole according to the invention.

FIG. 11 is a fragmentary elevational view, with portions broken away to show further detail, further illustrating the modified form of pole assembly shown in FIG. 10.

FIG. 12 is a fragmentary elevational view of another modified form of pole assembly according to the invention.

FIG. 13 is a side elevation of the pole and support arm shown in FIG. 12.

FIG. 14 is a fragmentary elevational and cross-sectional view of still another modified form of pole and lateral support arm assembly according to the invention.

FIG. 15 is a schematic, fragmentary elevation of a top cap equipped pole, with parts broken away for clarity.

DESCRIPTION OF THE PREFERRED EMBODIMENTS

The preferred technique for fabricating a resin coated pole according to the invention is described with reference to FIG. 1. Cut trees are first processed to produce the customary lathed poles 20 of generally cylindrical, somewhat tapered configuration. An elongated longitudinal kerf 21 is cut, as by a dado saw, almost the entire length of the pole, and a smaller, stress relieving slot 22 is also cut in the opposite side of the pole. The desired preservative, either of the oil base type such as a 5 percent by weight solution of pentachlorophenol in oil (per AWPA specifications) or of the water base type such as Chemohite or "Osmosalts," a 3 percent by weight water solution of fluorochrome arsenate phenol, is then pressure impregnated into the sapwood and part of the heartwood of the pole in the conventional manner. Next an electrical wiring conduit 23 is placed in the kerf 21 and is capped by a wood putty filler 24, as shown at FIG. 4. Main brackets 25 and auxiliary brackets 26 for mounting a laterally extending support arm 27 are then attached to the pole.

The kerfed and conduit emplaced pole is then mounted in a conventional pole lathe and covered with a coating of Cellophane, Kraft paper or the like if desired, then slowly rotated while a coating of mixed resin and chopped glass fibers is sprayed over the entire surface of the pole spanning the kerf 21 and slot 22 to form a coating or casing 28 to a depth of at least about 1/10 inch and preferably about ⅛. Typically, the coating is composed of 4½ parts resin to 1 part glass fibers by weight and the glass fibers are chopped in 1 inch lengths from roving having sixty threads per strand. Any desired color can be imparted to the coating, such as blue, gray or aqua, simply by adding known coloring agents to the resin mix in a manner conventional per se.

Upon hardening of the coating 28, the pole is removed from the lathe, wrapped with paper for shipment if desired, and transported to the place of installation. At the installation site laterally extending support arm, the light fixture 29, and electrical connections (not shown), etc. are assembled and the pole assembly is emplaced in the ground and electrically connected in the usual manner. The types of coatings, impregnating preservatives, support arm configurations, as will be described hereinafter, may vary widely as determined by the particular job specifications.

The pole 20, with its outer sapwood layer 30 and inner heartwood core 32, is dado cut longitudinally over a substantial length to form the kerf 21. As can be seen in FIG. 2, this kerf extends through the sapwood and slightly into the heartwood and serves to assist in complete impregnation of the wood by exposing the heartwood to the pressurized preservative. Preferably, a slot 22 is also provided on the opposite side of the pole and extends into but not necessarily through the sapwood 30. The slot 22 preferably extends the entire length of the pole but may be limited to a length corresponding to the length of the kerf 21. The slot 22 serves to relieve stresses in the pole during normal shrinkage and also assists in counterbalancing any stresses caused by the kerf 21. Both the slot 22 and the unfilled portion of the kerf 21 (note FIG. 4) also serve as ventilation "chimneys" to help maintain the moisture content of the pole at approximately ambinet after the pole is installed. The kerf 21 and slot 22 also provide boundary areas in the coating 28 in which circumferential stresses in the coating 28 and/or the sapwood 30 are relieved on the occasion of differential expansion between the sapwood 30 and casing 28.

As illustrated in FIG. 3, after the kerf 21 and elongated slot 22 have been cut in the pole 20, the pole is treated in a conventional manner to impregnate the sapwood and at least part of the heartwood with the desired preservative. In the preferred embodiment an oil base preservative, such as pentachlorophenol in oil, is employed but a water-base preservative, such as fluorochrome arsenate phenol, can be used if desired. As may be readily seen, the kerf 21 exposes the heartwood 32 and assures better penetration thereof by the preservative.

As best illustrated in FIG. 4, after the pole 20 is impregnated with the desired preservative, the electrical conduit 23 is arranged in the kerf 21 and the pole profile substantially restored by the application of a wood putty cap 24 (formed of wood flour with polyester resin binder), or by application of a heavy gauge adhesive backed tape, applied along and spanning the width of the kerf 21, for example.

After the conduit 23 is in place and the filler 24 has hardened, the brackets 25 and 26 for mounting the laterally extending support arm 27 are fastened to the pole 20 (cf FIGS. 10 and 11). In the preferred form of the invention the main bracket 25 comprises a main bracket plate 34 which is curved to fit snguly in a recess 35 formed in the spawood of the pole. The main bracket plate is secured to the pole 20 by suitable metal fastenings such as the three lag bolts 36 which, when embedded by the plastic casing, provide a strong connection with the pole. Formed integrally on the main bracket plate 34 is a tubular shaft 38 extending laterally and at an upward angle therefrom. Telescoped over the tubular shaft is the support arm 27 which is preferably of arcuate form, as shown in FIG. 7, and of a tubular cross-section. The support arm is suitable for mounting the light fixture 29 (FIG. 7) which is conventionally connected to the conduit 23 by a cable 39. The tubular support arm is fastened to the tubular shaft by suitable means such as a pair of cap screws 40 threaded through mating holes in the support arm and tubular shaft.

The auxiliary bracket 26 comprises an auxiliary curved bracket plate 41 inset in recess 42 with its outward face substantially flush with the outer surface of the pole. The auxiliary bracket plate is secured in the recess by a plurality of lag bolts 43 covered by the plastic casing 28. A pair of notched ears 44 are integrally formed on the auxiliary bracket plate for a purpose later described. As will be readily observed, the resultant pole has a generally smooth and clean appearance, with only parts of the brackets extending outwardly of the pole profile.

The support arm 27 is also connected to the pole by an upper brace assembly 50, shown in FIGS. 7-9. The upper brace assembly 50 includes the auxiliary bracket 26 and a rectangular support bar 52 which extends generally tangentially of the pole in a plane perpendicular to the longitudinal plane of the support arm 27 and is fitted into the notched ears 44. Secured to the opposed ends of the support rod 52 are a pair of rigid braces 54 which pass through holes in the support rod adjacent both ends thereof. The ends of the braces are threaded and are bolted against spacers 56 that abut the side of the support rod remote from the lateral support arm 27. The other ends of the rigid braces are suitably pinned to an eye 66 welded to the support arm 27. As may be readily seen, the upper brace assembly 50 secures the support arm 27 in a manner making the support arm rigid and strong.

After the brackets 25 and 26 are installed, in the form of the invention shown in FIGS. 10 and 11, the pole is placed on a pole lathe and rotated slowly while a mixture of catalyzed polyester resin and chopped glass fibers is sprayed over the pole including brackets and conduit 23. The mixing of the resin and fibers takes place in a conventional mixing gun which is movably mounted adjacent the lathe for traversing the length of the pole to be coated. Preferably the desired coating thickness is built up during several continuing passes of the gun. In the preferred embodiment shown in FIGS. 10 and 11, the upper and lower ends of the conduit 23 protrude from the kerf 21 while the pole is being coated. Consequently, the casing will have an opening 58 at an upper portion of the pole and a lower opening 60 (FIG. 7) located in a lower portion of the pole. The lower portion of the pole is adapted to be placed below ground level (indicated generally by the reference character 62 — FIG. 7).

Placing the bracket plates 34 and 41 beneath the resin coating as in FIGS. 10 and 11 improves the exterior appearance of the pole and improves the strength of the interconnections between the brackets and the pole. The absence of both holes and the like through the casing also minimizes moisture leakage inside the coating.

A modified form of pole with brackets mounted exteriorly of the resin coating is shown in FIGS. 7-9. In this form the pole 20' is treated as in the preferred embodiment, except that the brackets are not installed prior to application of the resin coating 28'. With the resin coating 28' applied over the kerfs 21, 22 and conduit 23, main bracket plate 34' is secured to the pole 20' outside of the coating 28' by a through bolt 72 and a pair of spaced lag bolts 74, together with a pair of conventional steel binding straps 76. End ridges 78 are provided on the bracket 34' to ensure retention of the straps 76. Formed integrally on the main bracket plate 34' is the tubular shaft 38 extending laterally and at an upward angle therefrom. Telescoped over the tubular shaft is the curved tubular support arm 27 which mounts the light fixture 29. The tubular support arm 27, as before, is fastened to the tubular shaft by a pair of cap screws 40 threaded through mating holes in the support arm and tubular shaft.

As in the preferred embodiment, the support arm 27 is also connected to the pole 20 by the upper brace assembly 50 which includes an auxiliary bracket plate 41 which in this instance is secured externally of the pole coating 28' by a pair of lag bolts 77. Formed integrally on the auxiliary bracket plate 41 is the notched pair of ears 44. Mounted in the notched ears is the rectangular support bar 52. Secured to the opposed ends of the support bar 52 are a pair of rigid braces 54. The ends of the braces remote from the support bar are suitably bolted to the support arms as in the preferred embodiment.

FIGS. 12–14 illustrate modified forms of lighting device support arm assemblies. In these instances pole 80 may be a resin coated pole as in the earlier discussed assemblies, or may be an unencased wooden pole or a metal pole if desired. In whichever form used, the pole 80 is provided with an inclined central bore 84, shown in dotted lines in FIG. 12, extending from one side of the pole to the other. A single-piece support arm 86 comprises a laterally and upwardly extending straight portion 86a and a sharply curved opposite end 86b. The support arm is preferably tubular and a light fixture, not shown, may be supported at the end of the striaght portion 86a. An electrical cable, shown by dotted line 87, emerges from the conduit 88 emplaced in the pole (i.e. situated in kerf 89, in the case when pole 80 is wooden, as illustrated, or simply laid inside a pole, in the case where a hollow metal pole is used). As shown in FIGS. 12 and 13, kerf 89 extends along the side of the pole 80 opposite the laterally extending portion 86a of the support arm and the conduit meets the arm at the sharply curved end 86b. The sharply curved end 86b is split to form ears 90 and is secured to the pole by lag bolts 91 or other suitable means.

The support arm assembly modification shown in FIG. 14 incorporates an auxiliary lower brace 94 and is otherwise identical to the arm assembly shown in FIGS. 12 and 13. The support arm 86 passes through central bore 84 and is secured to the pole at its sharply curved end 86b. The end 86b, and the lower end of brace 94, are secured to the pole 20 by lag bolts 96 and a pole encircling strap 97. The upper end of brace 94 is secured to the support arm 86 by a strap 98. As may be readily seen, the brace 94 provides added rigidity and strength.

When the impregnated preservative is of the oil base type, a phenomenon called "bleeding" takes place because the preservative is placed within the pole under pressure and as the pressure is relieved the preservative often tends to migrate out of the pole. Any pin holes in the pole's resin coating can permit preservative leakage through the casing, causing a somewhat unsightly appearance in some instances. Where this appearance consideration is of consequence, a wrapping 106 of adhesively backed cellophane, Kraft paper or the like may be applied to the pole 20 prior to the application of the resin and glass fiber coating 28 (note FIGS. 1 and 5). Such wrap 106 is more usually used with the oil base preservative and is essentially impervious to the preservative so that bleeding will not appear through the casing. As still a further means to assure minimal voids in the resin casing, the resin can be applied as two or more separate coats, with the first coat being allowed to harden completely prior to application of the second coat, and so on. In this technique any voids in the inner coat caused by air bubbles and the like will in substantially all cases not align with the voids in the outer coat or coats and thus the combined coating layers are substantially impervious to ingress of outside air or moisture or egress of inside impregnated preservative. Of course, combinations of the above techniques may also be employed.

When a water base preservative is used, another problem may be encountered. The water soluble preservative salts can leach out if substantial water flow through the pole is allowed to occur. To prevent this, the pole 20 having a kerf 21 and a resin coating 28 can also be provided with a plastic or metallic cap 100, as shown in FIG. 15, which cap overhangs the unencased top of the pole and is attached firmly thereto, as by nail 101.

Although the invention has been described with reference to certain typical embodiments thereof, it is to be understood that these embodiments are presented only by way of example and that numerous changes in the details of the technique and construction may be resorted to without departing from the invention as defined by the following claims.

What is claimed is:

1. A resin coated wooden utility pole comprising:
   a. a wooden pole having rings of heartwood and sapwood encircling a longitudinal axis and also having a lower portion adapted to be inserted into the ground;
   b. at least one kerf cut through said sapwood and extending for at least most of the length of said pole;
   c. an electrical conduit disposed in said kerf;
   d. a preservative impregnating at least most of the sapwood and at least part of the heartwood of the kerfed pole;
   e. a substantially impervious, protective resin coating covering the exterior surface of said pole for at least most of the length thereof, and being disposed to span but not fill said kerf; and
   f. support arm bracket means attached to said pole prior to application of the protective resin coating and at least in part encased by said protective resin coating.

2. A utility pole according to claim 1, wherein said pole is provided with a recess and wherein said support arm bracket means is secured to said pole and occupies said recess, and wherein said resin coating substantially covers said support arm bracket means so that the coated pole has a relatively smooth outward appearance.

3. A utility pole according to claim 1, comprising lower and upper support arm bracket means attached to the pole prior to application of the protective resin coating, and with both said upper and lower support arm bracket means being at least in part encased by said protective resin coating.

4. A utility pole assembly including a resin coated utility pole according to claim 1, wherein said electrical conduit means arranged within said kerf enters said resin coating in the lower portion of said pole and emerges from said resin coating in the upper portion of said pole; and laterally extending luminaire support arm means attached to said support arm bracket means substantially at the point of emergence of the electrical conduit means from the pole, said electrical conduit means being channelled within said support arm means.

5. The utility pole assembly according to claim 4, wherein said pole is emplaced in the ground and said electrical conduit entrance point in the lower portion of said pole is below ground level, said assembly further including illuminating means secured to the distal end of said laterally extending luminaire support arm means.

6. The utility pole assembly according to claim 4, wherein said kerf is on the same side of said pole as the distal end of said laterally extending luminaire support arm means.

7. The utility pole assembly according to claim 4, wherein said kerf is on the side of said pole opposite the distal end of said laterally extending luminaire support arm means.

8. The utility pole assembly according to claim 4, further including an upper brace assembly having a support bar extending tangentially of said pole and a pair of rods secured to said support bar and to said support arm means.

9. The utility pole assembly according to claim 4, wherein said support arm bracket means is secured to said pole exteriorly of said resin coating.

10. A resin coated wooden utility pole comprising:
    a. a wooden pole having rings of heartwood and sapwood encircling a longitudinal axis and also having a lower portion adapted to be inserted into the ground and an upper portion including a bore extending across said pole at an acute angle with said longitudinal axis;
    b. at least one kerf cut through said sapwood and extending for at least most of the length of said pole;
    c. an electrical conduit disposed in said kerf;
    d. a preservative impregnating at least most of the sapwood and at least part of the heartwood of the kerfed pole;
    e. a substantially impervious, protective resin coating covering the exterior surface of said pole for at least most of the length thereof, and being disposed to span but not fill said kerf; and
    f. luminaire support arm means extending through said bore and terminating in a downwardly curved lower end secured to said pole.

11. The utility pole assembly according to claim 10, further including an auxiliary brace secured to the side of said pole opposite said downwardly curved end, the said auxiliary brace extending upwardly and laterally into engagement with said support arm means.

12. A utility pole assembly comprising:
    a. a pole having interiorly placed electrical conduit means extending within the pole from the lower portion to the upper portion of the pole and emerging from the pole below the top thereof;
    b. luminaire support means fastened to and supported by the pole in the upper portion thereof, said luminaire support means comprising a curved tubular member with the lower end thereof fastened to the pole substantially at the point of emergence of the electrical conduit means, said tubular member extending in curved pattern away from the pole and through an inclined hole passing substantially through the center of the pole then emerging from the pole at a point above and on the opposite side of the pole from the aforesaid point of emergence of the electrical conduit means from the pole, said electrical conduit means being housed in said tubular member and extending the length thereof, and
    c. luminaire means fastened to said support arm means at the outer end thereof.

13. A utility pole assembly according to claim 12, further comprising auxiliary support arm means attached to the pole about diametrically opposite the aforesaid point of emergence of the electrical conduit means from the pole and extending upwardly along a curved arc to a point of connection with the support arm means containing the electrical conduit.

14. A utility pole assembly according to claim 13, including a single metal band encircling the pole and attaching the lower end of said tubular member and the lower end of said auxiliary support arm means to the pole.

* * * * *